(12) United States Patent
Orlando et al.

(10) Patent No.: US 6,711,887 B2
(45) Date of Patent: Mar. 30, 2004

(54) AIRCRAFT GAS TURBINE ENGINE WITH TANDEM NON-INTERDIGITATED COUNTER ROTATING LOW PRESSURE TURBINES

(75) Inventors: Robert Joseph Orlando, West Chester, OH (US); Thomas Ory Moniz, Loveland, OH (US)

(73) Assignee: General Electric Co., Schenectady, NY (US)

( * ) Notice: Subject to any disclaimer, the term of this patent is extended or adjusted under 35 U.S.C. 154(b) by 80 days.

(21) Appl. No.: 10/223,163

(22) Filed: Aug. 19, 2002

(65) Prior Publication Data

US 2004/0031260 A1 Feb. 19, 2004

(51) Int. Cl.[7] ............................................. F02C 3/073
(52) U.S. Cl. .................... 60/39.162; 415/68; 415/199.5
(58) Field of Search ........................... 60/39.162, 226.1, 60/791, 792, 726; 415/68, 199.5

(56) References Cited

U.S. PATENT DOCUMENTS

| | | | |
|---|---|---|---|
| 1,398,124 A | * | 11/1921 | Cake ............................ 415/68 |
| 2,711,304 A | * | 6/1955 | Burton ......................... 415/68 |
| 3,678,690 A | * | 7/1972 | Shohet et al. ................. 415/68 |
| 4,010,608 A | | 3/1977 | Simmons |
| 4,064,692 A | | 12/1977 | Johnson et al. |
| 4,860,537 A | | 8/1989 | Taylor |
| 4,965,994 A | | 10/1990 | Ciokajlo et al. |
| 4,969,325 A | | 11/1990 | Adamson et al. |
| 4,976,102 A | | 12/1990 | Taylor |
| 5,010,729 A | | 4/1991 | Adamson et al. |
| 5,274,999 A | | 1/1994 | Rohra et al. |
| 5,307,622 A | | 5/1994 | Ciokajlo et al. |
| 5,361,580 A | | 11/1994 | Ciokajlo et al. |
| 5,404,713 A | | 4/1995 | Johnson |
| 5,443,590 A | | 8/1995 | Ciokajlo et al. |
| 5,809,772 A | | 9/1998 | Giffin, III et al. |
| 5,911,679 A | * | 6/1999 | Farrell et al. ................. 60/726 |
| 6,339,927 B1 | | 1/2002 | DiPietro, Jr. |
| 6,393,831 B1 | | 5/2002 | Chamis et al. |

* cited by examiner

*Primary Examiner*—Michael Koczo
(74) *Attorney, Agent, or Firm*—Nathan D. Herkamp; Steven J. Rosen

(57) ABSTRACT

A low pressure turbine section for an aircraft gas turbine engine includes a low pressure turbine flowpath and counter rotatable low pressure inner and outer shaft rotors having inner and outer shafts, respectively. The low pressure inner and outer shaft rotors include low pressure first and second turbine blade rows disposed across the turbine flowpath and drivingly connected to first and second fan blade rows, respectively. The first low pressure turbine blade rows are disposed downstream of the second low pressure turbine blade rows along said low pressure turbine flowpath. Rows of non-rotatable low pressure vanes are disposed across the low pressure turbine flowpath between the first low pressure turbine blade rows and between the second low pressure turbine blade rows. An annular vaneless gap may be located between an aftmost row of the second low pressure turbine blade rows and a forwardmost row of the first low pressure turbine blade rows.

40 Claims, 3 Drawing Sheets

AIRCRAFT GAS TURBINE ENGINE WITH TANDEM NON-INTERDIGITATED COUNTER ROTATING LOW PRESSURE TURBINES

BACKGROUND OF THE INVENTION

1. Field of the Invention

The invention relates to counter rotating aircraft gas turbine engines and low pressure turbines with counter rotating fans driven by counter rotating low pressure turbines and, particularly, for such engines and turbines incorporating vanes and having tandem non-interdigitated counter rotating low pressure turbines.

2. Description of Related Art

A gas turbine engine of the turbofan type generally includes a forward fan and booster compressor, a middle core engine, and an aft low pressure power turbine. The core engine includes a high pressure compressor, a combustor and a high pressure turbine in a serial flow relationship. The high pressure compressor and high pressure turbine of the core engine are interconnected by a high pressure shaft. The high pressure compressor, turbine, and shaft essentially form the high pressure rotor. The high pressure compressor is rotatably driven to compress air entering the core engine to a relatively high pressure. This high pressure air is then mixed with fuel in the combustor and ignited to form a high energy gas stream. The gas stream flows aft and passes through the high pressure turbine, rotatably driving it and the high pressure shaft which, in turn, rotatably drives the compressor.

The gas stream leaving the high pressure turbine is expanded through a second or low pressure turbine. The low pressure turbine rotatably drives the fan and booster compressor via a low pressure shaft, all of which form the low pressure rotor. The low pressure shaft extends through the high pressure rotor. Some low pressure turbines have been designed with counter rotating turbines that power counter rotating fans and booster or low pressure compressors. U.S. Pat. Nos. 4,860,537, 5,307,622, and 4,790,133 disclose low pressure counter rotating turbines that power counter rotating fans and booster or low pressure compressors. Most of the thrust produced is generated by the fan. Blade rows or stages of one of the counter rotating turbines turbine rotor are interdigitated with blade rows or stages of another of the counter rotating turbines. No stationary vanes are disposed between the interdigitated rows of blades. A radially outer drum supports blade rows of one of the counter rotating turbines. These blade rows depend radially inwardly from the drum. The drum requires a great deal of mass for structural reasons and is difficult to rotatably support from static frames of the engine.

Advanced gas turbine engines having counter rotating forward and aft fans and counter rotating boosters are being designed. It is desirable to design a counter rotating engine with a peak performance. It has been found that a peak performance can be attained when the forward fan operates at a higher fan pressure ratio and higher rotational speed than the aft fan. This can result in a substantial mis-match in horsepower and rotational speed between the counter rotating rotors. The counter rotating low pressure turbine is required to supply the necessary power to each of the forward and aft fans at the rotational speed of each fan. A conventional counter rotating turbine will operate at peak efficiency when the power split between both shafts is equal and when the rotational speeds are equal and opposite. In such a case, speed and horsepower ratios of the two rotors and turbines are substantially 1. It is highly desirable to have a gas turbine engine with counter rotating low pressure turbines that have different speed and horsepower ratios such as speed and horsepower ratios of 1.2 or more to attain peak fan efficiency. It is also desirable to have light weight counter rotating low pressure turbines that are easily rotatably supported by the engine's static frames.

SUMMARY OF THE INVENTION

An aircraft gas turbine engine includes a high pressure rotor having a high pressure turbine drivingly connected to a high pressure compressor by a high pressure shaft and rotatable about an engine centerline. The engine further includes counter rotatable low pressure inner and outer shaft rotors having low pressure inner and outer shafts, respectively, which are at least in part rotatably disposed co-axial with and radially inwardly of the high pressure rotor. The engine further includes a low pressure turbine section located aft of the high pressure rotor and having a low pressure turbine flowpath and tandem non-interdigitated counter rotating forward and aft low pressure turbines. The low pressure inner shaft rotor includes the aft low pressure turbine and the low pressure outer shaft rotor includes the forward low pressure turbine. The aft low pressure turbine includes first low pressure turbine blade rows disposed across the low pressure turbine flowpath and is drivingly connected to a first fan blade row by the low pressure inner shaft. The forward low pressure turbine includes second low pressure turbine blade rows disposed across the low pressure turbine flowpath and drivingly connected to a second fan blade row by the low pressure outer shaft. The first and second fan blade rows are disposed within a bypass duct radially outwardly bounded by a fan casing.

The first low pressure turbine blade rows are disposed downstream of the second low pressure turbine blade rows along the low pressure turbine flowpath. Rows of non-rotatable low pressure vanes are disposed across the low pressure turbine flowpath between first adjacent pairs of the first low pressure turbine blade rows and between second adjacent pairs of the second low pressure turbine blade rows.

An exemplary embodiment includes an aftmost row of the second low pressure turbine blade rows located upstream of a forwardmost row of the first low pressure turbine blade rows along the low pressure turbine flowpath and has an annular vaneless gap between the aftmost row of the second low pressure turbine blade rows and the forwardmost row of the first low pressure turbine blade rows. A turbine nozzle is disposed axially forward, upstream of, and adjacent to the second low pressure turbine blade rows. The exemplary embodiment has an equal number of the first low pressure turbine blade rows and the second low pressure turbine blade rows.

More particularly, the exemplary embodiment has four of the first low pressure turbine blade rows and four of the second low pressure turbine blade rows. The first low pressure turbine blade rows may be mounted on low pressure first turbine disks of the low pressure inner shaft rotor and the second turbine blade rows may be mounted on low pressure second turbine disks of low pressure outer shaft rotor. Alternatively, the first and second low pressure turbine blade rows may be mounted on drums of the low pressure inner and outer shaft rotors, respectively.

Various configurations of the low pressure turbine may be used. There may be an equal or an unequal number of the first and second low pressure turbine blade rows and there may be three or four or more of each of the first and the second low pressure turbine blade rows.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
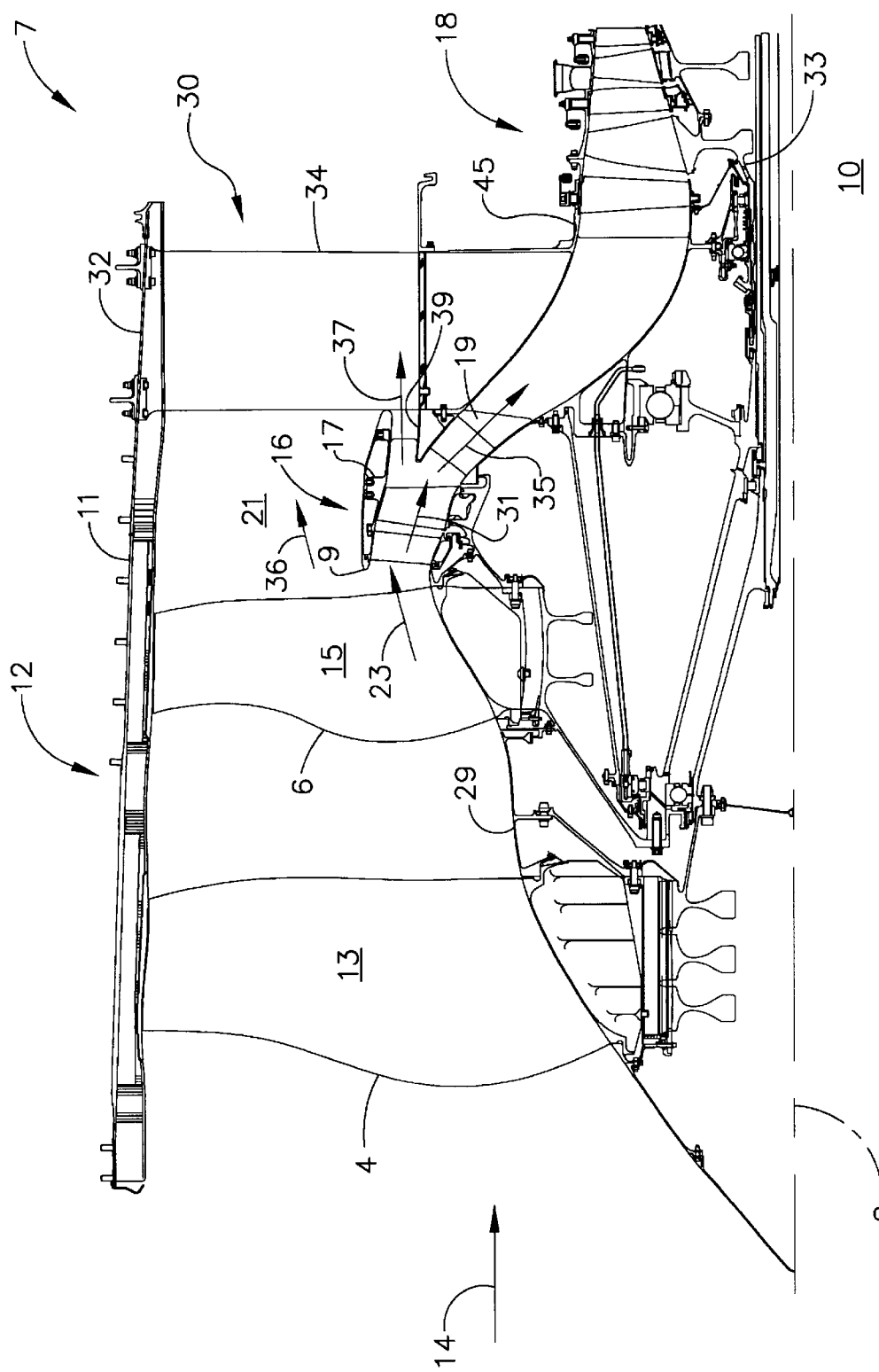
FIG. 1 is a longitudinal sectional view illustration of a forward portion of an exemplary embodiment of an aircraft turbofan gas turbine engine with a counter rotating low pressure turbine having stator vanes.

Illustrated schematically in FIG. 1 is a forward portion 7 of an exemplary turbofan gas turbine engine 10 circumscribed about an engine centerline 8 and having a fan section 12 which receives inlet airflow of ambient air 14. The engine 10 has frame structure 32 which includes a forward or fan frame 34 connected by engine casing 45 to a turbine center frame 60 and a turbine aft frame 155. The engine 10 is mounted within or to an aircraft such as by a pylon (not illustrated) which extends downwardly from an aircraft wing.

Figure 2:
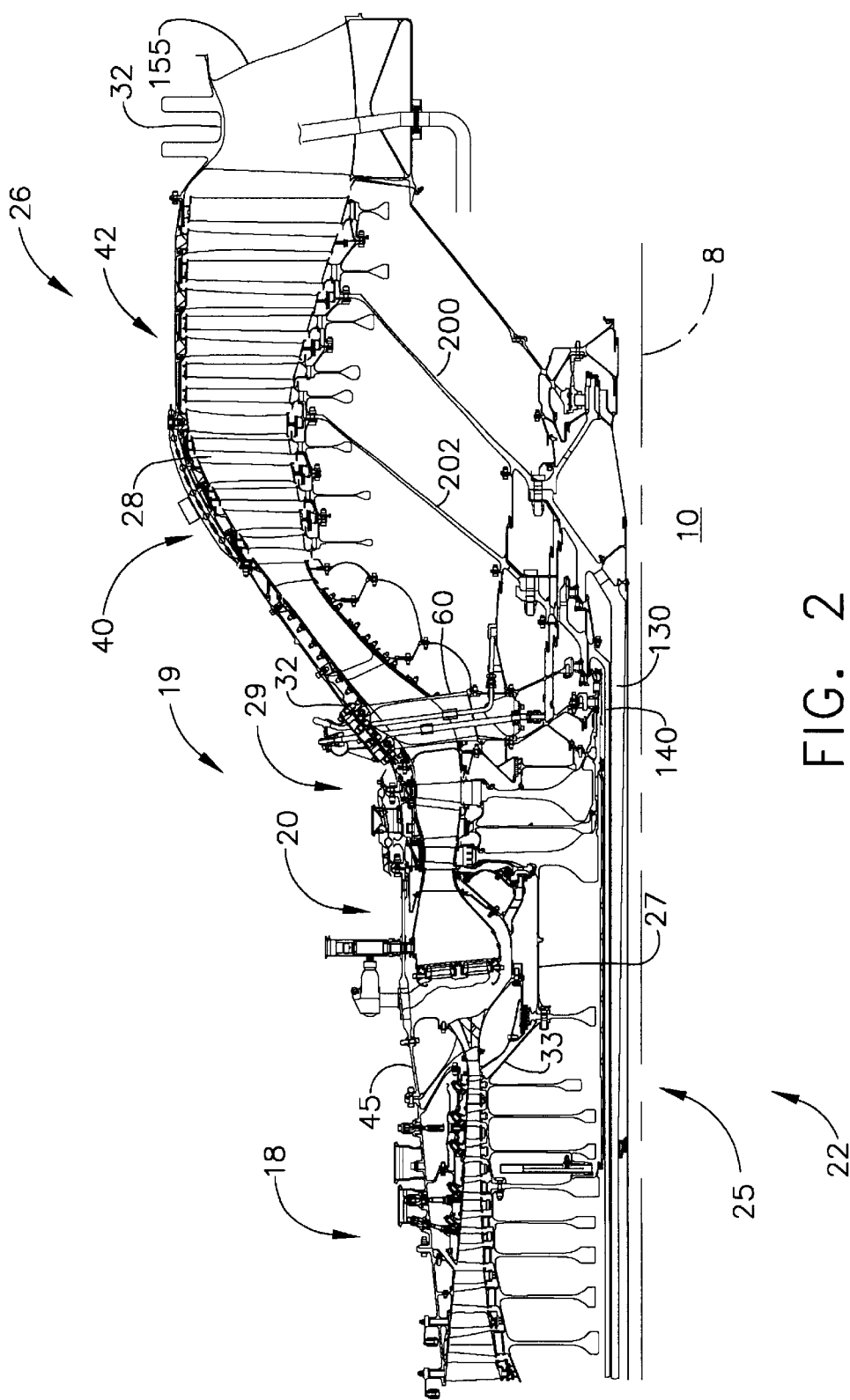
FIG. 2 is a longitudinal sectional view illustration of an aft portion of the engine.

The fan section 12 has counter rotating first and second fans 4 and 6 including forward and aft first and second fan blade rows 13 and 15, respectively, and, in the exemplary embodiment of the invention illustrated herein, a booster 16. The booster 16 is axially located aft of the counter rotating first and second fan blade rows 13 and 15 and is surrounded by a splitter shroud 17 having a leading edge splitter 9. Boosters are generally axially located between a first fan blade row and a core engine and may be located between counter rotating first and second fan blade rows. Following the fan section 12 is a high pressure compressor (HPC) 18 which is further illustrated in FIG. 2. FIG. 2 schematically illustrates an aft portion 22 of the engine 10.

Downstream of the HPC 18 is a combustor 20 which mixes fuel with the air 14 pressurized by the HPC 18 for generating combustion gases which flow downstream through a high pressure turbine (HPT) 29, and a counter rotating low pressure turbine section (LPT) 26 from which the combustion gases are discharged from the engine 10. A high pressure shaft 27 joins the HPT 29 to the HPC 18 to substantially form a first or high pressure rotor 33. The high pressure compressor 18, combustor 20, and high pressure turbine 29 collectively are referred to as a core engine 25 which includes, for the purposes of this patent, the high pressure shaft 27. The core engine 25 may be modular such that as a single unit it can be independently replaced separate from the other parts of the gas turbine. The engine 10 includes counter rotatable low pressure inner and outer shaft rotors 200 and 202 having low pressure inner and outer shafts 130 and 140, respectively, which are at least in part rotatably disposed co-axially with and radially inwardly of the high pressure rotor 33.

Referring back to FIG. 1, a bypass duct 21 is radially outwardly bounded by a fan casing 11 and in part the splitter shroud 17. The first and second fan blade rows 13 and 15 are disposed within a bypass duct 21 which is radially outwardly bounded by a fan casing 11. The splitter shroud 17 and leading edge splitter 9 splits fan flow air 23 exiting the second fan blade row 15 into a fan flow air first portion or booster air 31, into the booster 16 and a fan flow air second portion 36 around the booster 16 into the bypass duct 21 where it then exits the fan section 12 through a fan exit 30 providing thrust for the engine. The booster air 31, pressurized by the booster 16, exits the booster and is split into booster air first and second portions 35 and 37, respectively, by an inlet duct splitter 39. The inlet duct splitter 39 directs the booster air first portion 35 into an core engine inlet 19 leading to the high pressure compressor 18 of the core engine 25. The inlet duct splitter 39 also directs the booster air first portion around the core engine 25 into the bypass duct 21 where it then exits the fan section 12 through the fan exit 30.

Figure 3:
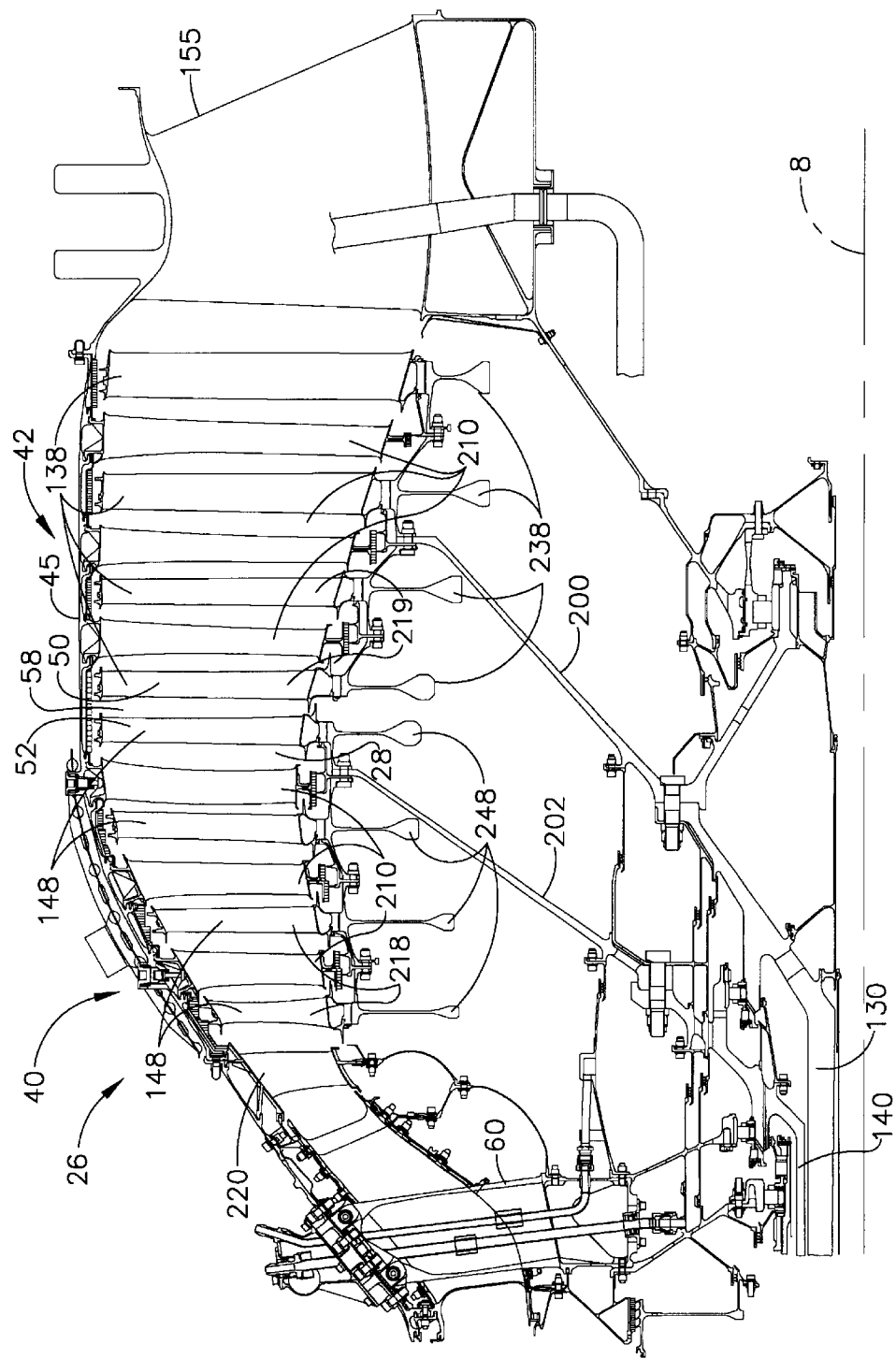
FIG. 3 is an enlarged view illustration of the counter rotating low pressure turbine illustrated in FIG. 1.

Referring now to FIGS. 2 and 3, the low pressure turbine section 26 includes tandem non-interdigitated counter rotating forward and aft low pressure turbines 40 and 42 and a low pressure turbine flowpath 28. The low pressure inner shaft rotor 200 includes the aft low pressure turbine 42 and the low pressure outer shaft rotor 202 includes the forward low pressure turbine of low pressure turbine section 26. The aft low pressure turbine 42 includes the first low pressure turbine blade rows 138 disposed across the low pressure turbine flowpath 28 and is drivingly connected to the first fan blade row 13 by the low pressure inner shaft 130.

The forward low pressure turbine 40 includes the second low pressure turbine blade rows 148 disposed across the low pressure turbine flowpath 28 and is drivingly connected to a second fan blade row 15 by the low pressure outer shaft 140. In the exemplary embodiment illustrated in FIGS. 2 and 3, there are four rows each of the first and second low pressure turbine blade rows 138 and 148. The booster 16 is drivingly connected to one of the low pressure inner and outer shafts 130 and 140.

As illustrated in FIGS. 2 and 3, the first low pressure turbine blade rows 138 are disposed downstream of the second low pressure turbine blade rows 148 along the low pressure turbine flowpath 28. Rows of non-rotatable low pressure vanes 210 are disposed across the low pressure turbine flowpath 28 between first adjacent pairs 219 of the first low pressure turbine blade rows 138 and between second adjacent pairs 218 of the second low pressure turbine blade rows 148. In the exemplary embodiment illustrated in FIGS. 2 and 3, an aftmost row 52 of the second low pressure turbine blade rows 148 is located upstream of a forwardmost row 50 of the first low pressure turbine blade rows 138 along the low pressure turbine flowpath 28. An annular vaneless gap 58 separates and is between the aftmost row 52 of the second low pressure turbine blade rows 148 and the forwardmost row 50 of the first low pressure turbine blade rows 138.

The tandem non-interdigitated counter rotating forward and aft low pressure turbines 40 and 42 helps the engine to operate at or near a peak performance by allowing the forward fan to operate at a higher fan pressure ratio and higher rotational speed than the aft fan while avoiding a substantial mis-match in horsepower and rotational speed between the counter rotating low pressure turbines and rotors. This allows the engine to operate with different speed and horsepower ratios such as speed and horsepower ratios of 1.2 or more to help attain peak fan efficiency. The tandem non-interdigitated counter rotating forward and aft low pressure turbines also are of a light weight design and are easily rotatably supported by the engine's static frames.

The exemplary embodiment has an equal number of the first low pressure turbine blade rows 138 and the second low pressure turbine blade rows 148. More particularly, the exemplary embodiment has four of the first low pressure turbine blade rows 138 and four of the second low pressure turbine blade rows 148. The first low pressure turbine blade rows 138 are illustrated as being mounted on low pressure first turbine disks 238 of the low pressure inner shaft rotor 200 and the second turbine blade rows 148 are illustrated as being mounted on low pressure second turbine disks 248 of low pressure outer shaft rotor 202. Alternatively, the first and second low pressure turbine blade rows 138 and 148 may be mounted on drums of the low pressure inner and outer shaft rotors 200 and 202, respectively. A turbine nozzle 220 is disposed axially forward, upstream of, and adjacent to the second low pressure turbine blade rows 148.

Various configurations of the low pressure turbine may be used. There may be an equal or an unequal number of the first and second low pressure turbine blade rows and there may be three or four or more of each of the first and the second low pressure turbine blade rows.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims.

What is claimed is:

1. A gas turbine engine turbine assembly comprising:
    a low pressure turbine section having a low pressure turbine flowpath and tandem non-interdigitated counter rotating forward and aft low pressure turbines,
    said aft low pressure turbine including first low pressure turbine blade rows disposed across said low pressure turbine flowpath,
    said forward low pressure turbine including second low pressure turbine blade rows disposed across said low pressure turbine flowpath,
    said first low pressure turbine blade rows disposed downstream of said second low pressure turbine blade rows along said low pressure turbine flowpath, and
    rows of non-rotatable low pressure vanes disposed across said low pressure turbine flowpath between first adjacent pairs of said first low pressure turbine blade rows and between second adjacent pairs of said second low pressure turbine blade rows.

2. An assembly as claimed in claim 1 further comprising an aftmost row of said second low pressure turbine blade rows located upstream of a forwardmost row of said first low pressure turbine blade rows along said low pressure turbine flowpath and an annular vaneless gap between said aftmost row of said second low pressure turbine blade rows and said forwardmost row of said first low pressure turbine blade rows.

3. An assembly as claimed in claim 2 wherein a turbine nozzle is disposed axially forward, upstream of, and adjacent to said second low pressure turbine blade rows.

4. An assembly as claimed in claim 3 further comprising an equal number of said first low pressure turbine blade rows and said second low pressure turbine blade rows.

5. An assembly as claimed in claim 4 further comprising an even number of said first low pressure turbine blade rows and of said second low pressure turbine blade rows.

6. An assembly as claimed in claim 5 further comprising four of said first low pressure turbine blade rows and four of said second low pressure turbine blade rows.

7. An assembly as claimed in claim 2 further comprising said first low pressure turbine blade rows mounted on low pressure first turbine disks of a low pressure inner shaft rotor and said second turbine blade rows mounted on low pressure second turbine disks of a low pressure outer shaft rotor.

8. An assembly as claimed in claim 7 wherein a turbine nozzle is disposed axially forward, upstream of, and adjacent to said second low pressure turbine blade rows.

9. An assembly as claimed in claim 8 further comprising an equal number of said first low pressure turbine blade rows and said second low pressure turbine blade rows.

10. An assembly as claimed in claim 9 further comprising an even number of said first low pressure turbine blade rows and of said second low pressure turbine blade rows.

11. An assembly as claimed in claim 10 further comprising four of said first low pressure turbine blade rows and four of said second low pressure turbine blade rows.

12. An assembly as claimed in claim 1 wherein a turbine nozzle is disposed axially forward, upstream of, and adjacent to said second low pressure turbine blade rows.

13. An assembly as claimed in claim 12 further comprising an equal number of said first low pressure turbine blade rows and said second low pressure turbine blade rows.

14. An assembly as claimed in claim 13 further comprising an even number of said first low pressure turbine blade rows and of said second low pressure turbine blade rows.

15. An assembly as claimed in claim 14 further comprising four of said first low pressure turbine blade rows and four of said second low pressure turbine blade rows.

16. An assembly as claimed in claim 12 further comprising said first low pressure turbine blade rows mounted on low pressure first turbine disks of a low pressure inner shaft rotor and said second low pressure turbine blade rows mounted on low pressure second turbine disks of a low pressure outer shaft rotor.

17. An assembly as claimed in claim 16 wherein a turbine nozzle is disposed axially forward, upstream of, and adjacent to said second low pressure turbine blade rows.

18. An assembly as claimed in claim 17 further comprising an equal number of said first low pressure turbine blade rows and said second low pressure turbine blade rows.

19. An assembly as claimed in claim 18 further comprising an even number of said first low pressure turbine blade rows and of said second low pressure turbine blade rows.

20. An assembly as claimed in claim 19 further comprising four of said first low pressure turbine blade rows and four of said second low pressure turbine blade rows.

21. An aircraft gas turbine engine assembly comprising:
    a high pressure rotor including a high pressure turbine drivingly connected to a high pressure compressor by a high pressure shaft and rotatable about an engine centerline,
    a low pressure turbine section located aft of said high pressure rotor and having a low pressure turbine flowpath, and tandem non-interdigitated counter rotating forward and aft low pressure turbines,
    said aft low pressure turbine including first low pressure turbine blade rows disposed across said low pressure turbine flowpath,
    said forward low pressure turbine including second low pressure turbine blade rows disposed across said low pressure turbine flowpath,
    said first low pressure turbine blade rows disposed downstream of said second low pressure turbine blade rows along said low pressure turbine flowpath, and rows of non-rotatable low pressure vanes disposed across said low pressure turbine flow path between first adjacent pairs of said first low pressure turbine blade rows and between second adjacent pairs of said second low pressure turbine blade rows.

22. An assembly as claimed in claim 21 further comprising an aftmost row of said second low pressure turbine blade rows located upstream of a forwardmost row of said first low pressure turbine blade rows along said low pressure turbine flowpath and an annular vaneless gap between said aftmost row of said second low pressure turbine blade rows and said forwardmost row of said first low pressure turbine blade rows.

23. An assembly as claimed in claim 22 wherein a turbine nozzle is disposed axially forward, upstream of, and adjacent to said second low pressure turbine blade rows.

24. An assembly as claimed in claim 23 further comprising an equal number of said first low pressure turbine blade rows and said second low pressure turbine blade rows.

25. An assembly as claimed in claim 24 further comprising an even number of said first low pressure turbine blade rows and of said second low pressure turbine blade rows.

26. An assembly as claimed in claim 25 further comprising four of said first low pressure turbine blade rows and four of said second low pressure turbine blade rows.

27. An assembly as claimed in claim 22 further comprising said first low pressure turbine blade rows mounted on low pressure first turbine disks of a low pressure inner shaft rotor and said second turbine blade rows mounted on low pressure second turbine disks of a low pressure outer shaft rotor.

28. An assembly as claimed in claim 27 wherein a turbine nozzle is disposed axially forward, upstream of, and adjacent to said second low pressure turbine blade rows.

29. An assembly as claimed in claim 28 further comprising an equal number of said first low pressure turbine blade rows and said second low pressure turbine blade rows.

30. An assembly as claimed in claim 29 further comprising an even number of said first low pressure turbine blade rows and of said second low pressure turbine blade rows.

31. An assembly as claimed in claim 30 further comprising four of said first low pressure turbine blade rows and four of said second low pressure turbine blade rows.

32. An assembly as claimed in claim 21 wherein a turbine nozzle is disposed axially forward, upstream of, and adjacent to said second low pressure turbine blade rows.

33. An assembly as claimed in claim 32 further comprising an equal number of said first low pressure turbine blade rows and said second low pressure turbine blade rows.

34. An assembly as claimed in claim 33 further comprising an even number of said first low pressure turbine blade rows and of said second low pressure turbine blade rows.

35. An assembly as claimed in claim 34 further comprising four of said first low pressure turbine blade rows and four of said second low pressure turbine blade rows.

36. An assembly as claimed in claim 32 further comprising said first low pressure turbine blade rows mounted on low pressure first turbine disks of a low pressure inner shaft rotor and said second turbine blade rows mounted on low pressure second turbine disks of a low pressure outer shaft rotor.

37. An assembly as claimed in claim 36 wherein a turbine nozzle is disposed axially forward, upstream of, and adjacent to said second low pressure turbine blade rows.

38. An assembly as claimed in claim 37 further comprising an equal number of said first low pressure turbine blade rows and said second low pressure turbine blade rows.

39. An assembly as claimed in claim 38 further comprising an even number of said first low pressure turbine blade rows and of said second low pressure turbine blade rows.

40. An assembly as claimed in claim 39 further comprising four of said first low pressure turbine blade rows and four of said second low pressure turbine blade rows.

* * * * *